United States Patent
Sugano et al.

(10) Patent No.: US 8,731,128 B2
(45) Date of Patent: May 20, 2014

(54) INDEXING DEVICE INSTALLATION UNIT

(75) Inventors: Ryujiro Sugano, Yokohama (JP); Yuichi Watanabe, Yokohama (JP)

(73) Assignee: Toshiba Plant Systems & Services Corporation, Yokohama-shi, Kanagawa (JP)

( * ) Notice: Subject to any disclaimer, the term of this patent is extended or adjusted under 35 U.S.C. 154(b) by 658 days.

(21) Appl. No.: 12/997,040

(22) PCT Filed: Jun. 9, 2009

(86) PCT No.: PCT/JP2009/060498
§ 371 (c)(1),
(2), (4) Date: Dec. 9, 2010

(87) PCT Pub. No.: WO2009/151040
PCT Pub. Date: Dec. 17, 2009

(65) Prior Publication Data
US 2011/0096889 A1    Apr. 28, 2011

(30) Foreign Application Priority Data
Jun. 10, 2008  (JP) ................ P2008-151467

(51) Int. Cl.
*G21C 19/00*    (2006.01)
(52) U.S. Cl.
USPC .......................................... 376/260
(58) Field of Classification Search
USPC ........... 376/260, 245; 187/270, 267; 254/103, 254/102, 92, 85, 99; 60/408, 698
See application file for complete search history.

(56) References Cited

U.S. PATENT DOCUMENTS

| | | | | |
|---|---|---|---|---|
| 3,768,628 A * | 10/1973 | Bross | ............................ | 198/532 |
| 3,851,854 A * | 12/1974 | Roybal | ........................ | 254/7 C |
| 3,854,696 A * | 12/1974 | Keyes et al. | .................. | 251/163 |
| 4,600,085 A * | 7/1986 | Gagnon et al. | ................ | 187/268 |
| 5,343,581 A * | 9/1994 | Bartley et al. | ..................... | 5/611 |
| 5,722,304 A * | 3/1998 | Allen | .............................. | 74/586 |
| 5,938,382 A * | 8/1999 | Andre et al. | .................... | 410/24 |
| 7,370,725 B1 * | 5/2008 | Dornfeld | ........................ | 182/2.2 |
| 8,286,754 B2 * | 10/2012 | Cohn | ............................ | 187/267 |

FOREIGN PATENT DOCUMENTS

| | | |
|---|---|---|
| JP | 9-178879 | 7/1997 |
| JP | 2003-4889 | 1/2003 |

OTHER PUBLICATIONS

International Search Report issued by the Japanese Patent Office on Sep. 15, 2009, for International Application No. PCT/JP2009/060498.
International Preliminary Report on Patentability issued by the International Bureau of WIPO on Feb. 10, 2011, for International Application No. PCT/JP2009/060498.

* cited by examiner

*Primary Examiner* — Jack W Keith
*Assistant Examiner* — Marshall O'Connor
(74) *Attorney, Agent, or Firm* — Finnegan, Henderson, Farabow, Garrett & Dunner, L.L.P.

(57) ABSTRACT

Maintainability of a traversing in-core probe is improved without any hindrance to passage and the like in an access tunnel in which an indexing device of a TIP system is installed. An indexing device installation unit provided in the TIP system includes: a base on which an indexing device of a traversing in-core probe used in a nuclear reactor is mounted; a holding part holding the base in a suspended state in an access tunnel formed in a nuclear reactor containment vessel; and a lift mechanism moving up and down the base held by the holding part together with the indexing device.

4 Claims, 3 Drawing Sheets

INDEXING DEVICE INSTALLATION UNIT

TECHNICAL FIELD

The present invention relates to an indexing device installation unit on which an indexing device of a traversing in-core probe (TIP) used in a nuclear reactor is installed.

BACKGROUND ART

In order to realize safety securement, soundness maintenance of a fuel, and efficient combustion of the fuel in a nuclear reactor, power distributions at respective parts of a reactor core are monitored by detectors of a neutron instrumentation system. Specifically, the detectors of the neutron instrumentation system such as a source range monitor, an intermediate range monitor, a local range power monitor are dispersed in a reactor core in a state of being housed in in-core instrumentation tubes.

The in-core instrumentation tubes are sequentially changed at the time of regular inspections according to a plan in consideration of life of the detectors of the neutron instrumentation system and irradiation life of the in-core instrumentation tubes themselves.

Here, a nuclear reactor containment vessel of a plant using the traversing in-core probe generally has an access tunnel inside. This access tunnel enables a worker to access a nuclear reactor pressure vessel side from the outside at the time of, for example, the regular inspection of the traversing in-core probe. Further, on a ceiling portion in the access tunnel, indexing devices for guiding a guide tube to the nuclear reactor pressure vessel side is installed.

RELEVANT REFERENCES

Patent References

Reference 1: JP-A HEI 9-178879 (KOKAI)

SUMMARY OF THE INVENTION

Problems to Be Solved by the Invention

However, the installation of the indexing devices on the ceiling portion in the access tunnel is a factor to lower miaintenability. A possible solution to this may be to install the indexing devices on a lower part in the access tunnel. In this case, however, easiness in carrying devices, passage of a worker, and the like are hindered.

The present invention was invented to solve such a problem, and has an object to provide an indexing device installation unit capable of improving maintainability of a traversing in-core probe without any hindrance to passage and so on in an access tunnel in which an indexing device is installed.

Means for Solving the Problems

To attain the above object, an indexing device installation unit according to an aspect of the present invention includes: a base on which an indexing device of a traversing in-core probe used in a nuclear reactor is mounted; a holding part holding the base in a suspended state in an access tunnel provided in a nuclear reactor containment vessel; a lift mechanism moving up and down the base held by the holding part together with the indexing device.

Effect of the Invention

According to the present invention, it is possible to provide an indexing device installation unit capable of improving maintainability of a traversing in-core probe without any hindrance to passage and so on in an access tunnel in which an indexing device is installed.

MODE FOR CARRYING OUT THE INVENTION

Hereinafter, an embodiment for carrying out the present invention will be described based on the drawings. In this embodiment, a TIP system 1 including a traversing in-core probe (TIP) realizes safety securement, soundness maintenance of a fuel, and efficient combustion of the fuel in a nuclear reactor. To realize these, in the TIP system 1, detectors of a neutron instrumentation system are dispersed in a reactor core. Further, the detectors of the neutron instrumentation system are disposed in a state of being housed in in-core instrumentation tubes. The detectors of the neutron instrumentation system are, for example, a source range monitor, an intermediate range monitor, a local range power monitor, and the like.

Figure 1:
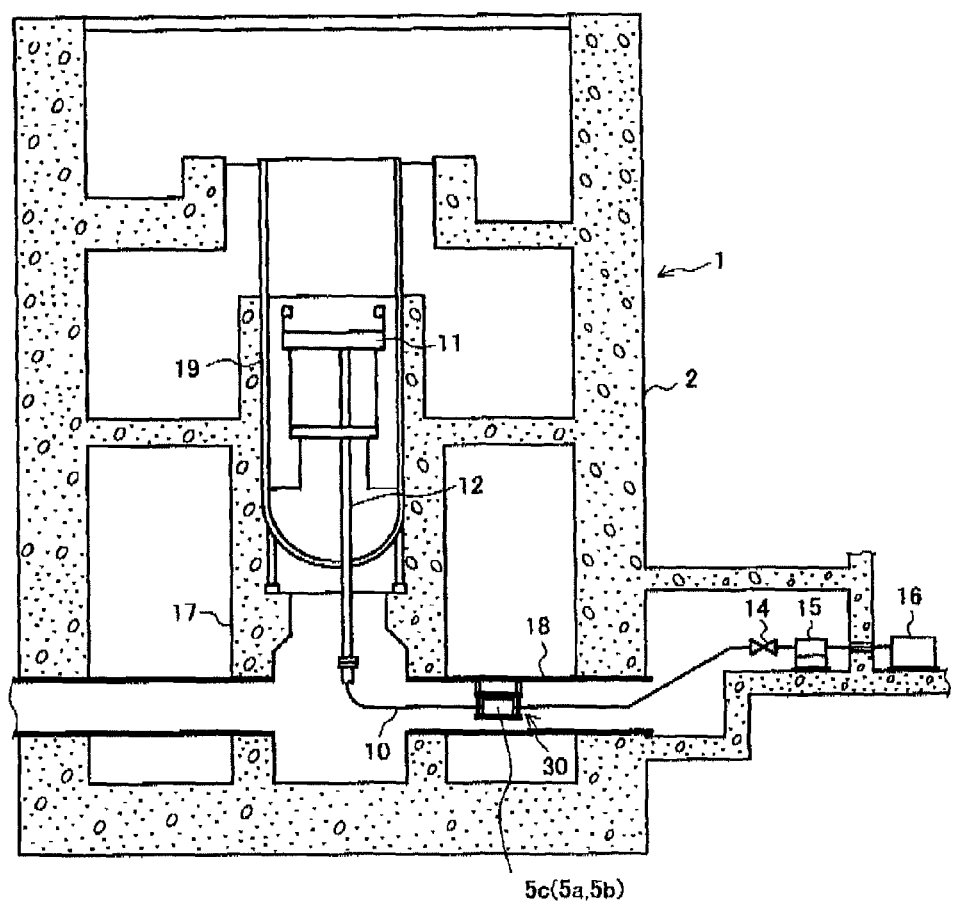
FIG. 1 is a view schematically showing a TIP system according to an embodiment of the present invention.

Specifically, as shown in FIG. 1, the TIP system 1 includes a nuclear reactor containment vessel 2, an upper grid 11, a local power range monitor detector 12, a pedestal 17, a nuclear reactor pressure vessel 19, a valve assembly 14, a shielding vessel 15, a TIP driver (detector driver) 16, three indexing devices (TIP indexing devices (5a, 5b, 5c), and an indexing device installation unit 30.

The nuclear reactor pressure vessel 19 is fixed on the pedestal 17 in the nuclear reactor containment vessel 2. The nuclear reactor pressure vessel 19 houses a coolant and a reactor core. The reactor core is composed of a plurality of fuel assemblies, a control rod, and so on.

The local power range monitor detector 12 is provided in the nuclear reactor pressure vessel 19. A guide tube 10 is led from the TIP driver 16 to the indexing devices 5a, 5b, 5c in the nuclear reactor containment vessel 2 via the shielding vessel 15 and the valve assembly 14. The guide tube 10 is one tube from the TIP driver 16 to the indexing devices 5a, 5b, 5c. Further, the guide tube 10 branches off to, for example, ten or twenty) tubes from exits of the indexing devices 5a, 5b, 5c toward a local power range monitor detector 12 side.

The local power range monitor detector 12 is installed so as to correspond to the ten or twenty) guide tubes 10. That is, the indexing devices 5a, 5b, 5c selectively switch the insertion of the guide tubes 10 to a plurality of areas provided in the local power range monitor detector 12.

Here, the nuclear reactor containment vessel 2 of the TIP system 1 of this embodiment includes an access tunnel 18 inside. The access tunnel 18 enables a worker to access the nuclear reactor pressure vessel 19 side from the outside at the time of, for example, a regular inspection of the traversing in-core instrumentation system, as shown in FIG. 1. The indexing devices 5a, 5b, 5c are installed in the access tunnel 18 via the indexing device installation unit 30.

Figure 2:
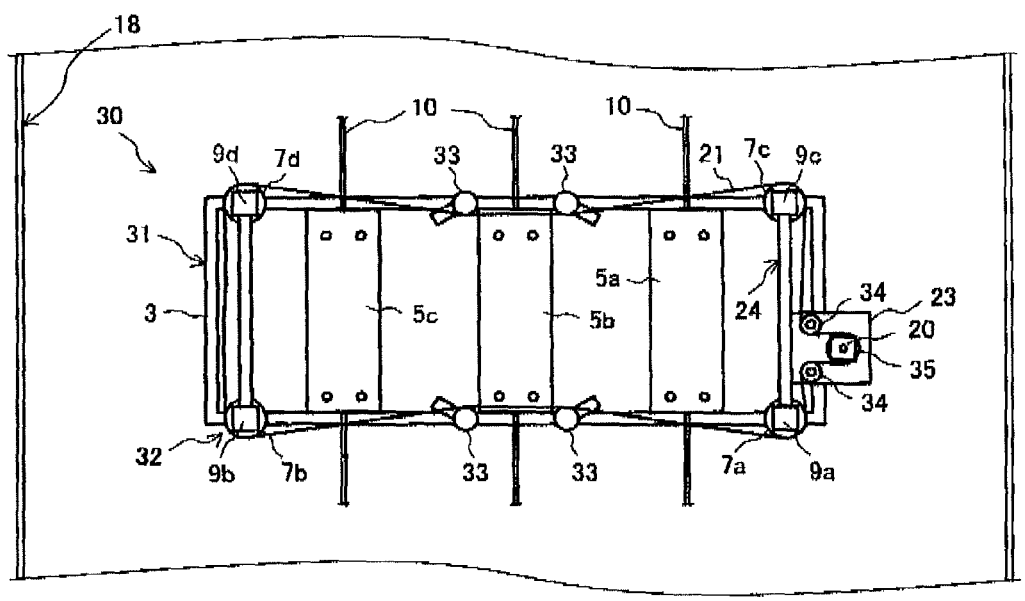
FIG. 2 is a schematic plane view showing an indexing device installation unit included in the TIP system in FIG. 1.
Figure 3:
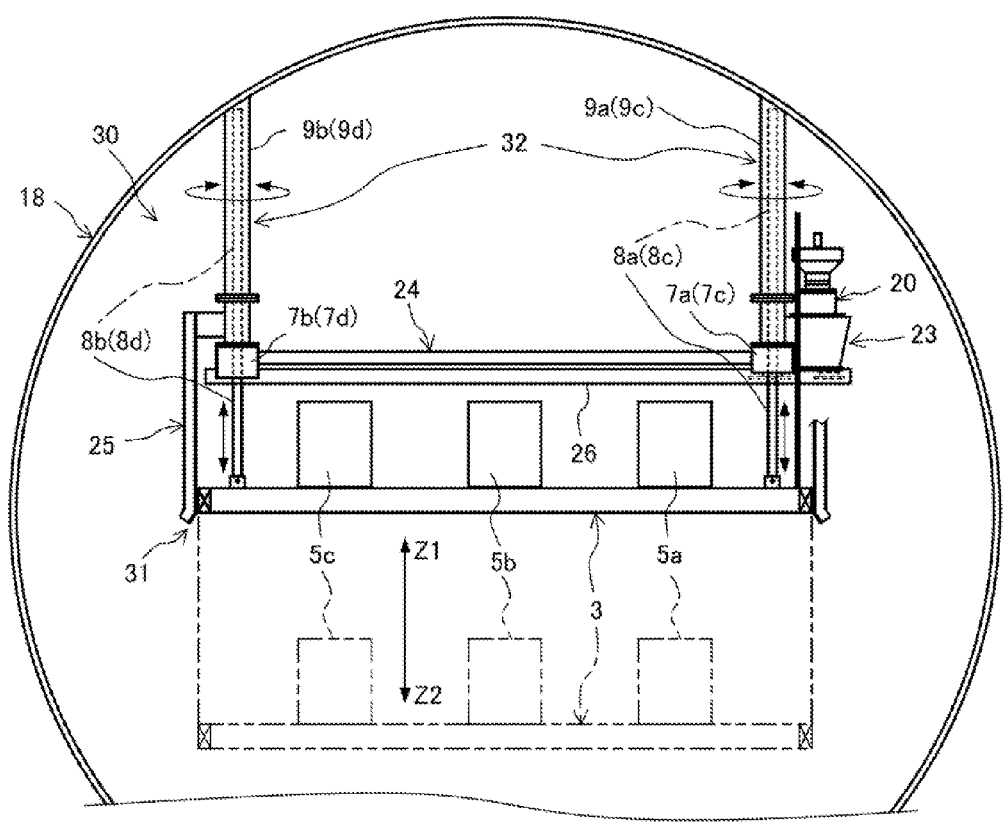
FIG. 3 is a schematic side view showing the indexing device installation unit in FIG. 2.

Next, the structure of the indexing device installation unit 30 will be described in detail based on FIG. 2 and FIG. 3. As schematically shown in FIG. 2 and FIG. 3, the indexing device installation unit 30 includes a base 3 formed in a rectangular shape, a holding part 32, and a lift mechanism 31.

The base 3 has the indexing devices 5a, 5b, 5c mounted thereon. In the access tunnel 18, the holding part 32 holds the base 3 in a suspended state from a ceiling portion of the access tunnel 18. The lift mechanism 31 moves the base 3 held by the holding part 32 up and down in an arrow Z1-Z2 direction together with the indexing devices 5a, 5b, 5c.

Further, the holding part 32 is provided in four sets so as to hold corner portions of the rectangular base 3 respectively in a suspended state. Specifically, the holding part 32 has four male-threaded shafts 8a, 8b, 8c, 8d and four female-threaded sleeves 9a, 9b, 9c, 9d as cylindrical members to which sprockets 7a, 7b, 7c, 7d are fitted. Further, the holding parts 32 have frames 24, 25.

Upper sides of the four female-threaded sleeves 9a to 9d to which the sprockets 7a to 7d are fitted are attached to the ceiling portion of the access tunnel 18. Bottom sides of the female-threaded sleeves 9a to 9d to which the sprockets 7a to 7d are fitted are held by the frames 24, 25. Bottom sides of the four male-threaded shafts 8a to 8d are fixed to upper sides of the corner portions of the base 3 respectively.

Here, male threads are formed on peripheral surfaces of the male-threaded shafts 8a to 8d. Further, female threads to which the male threads of the male-threaded shafts 8a to 8d are screwed are formed on inner wall surfaces of the female-threaded sleeves 9a to 9d to which the sprockets 7a to 7d are fitted with this structure, shaft-shaped structures, being main body portions of the holding parts 32, in which the male-threaded shafts 8a to 8d are screwed to the female-threaded sleeves 9a to 9d to which the sprockets 7a to 7d are fitted are changed in length by a change in a screwing depth of the male screws to the female screws.

As shown in FIG. 2 and FIG. 3, the lift mechanism 31 includes an air motor 20 serving as a driving source of the lift mechanism 31, a motor bracket 23, a motor gear 35, relay gears 33, 34, the sprockets 7a, 7b, 7c, 7d fixed on outer peripheral surfaces of the female-threaded sleeves 9a, 9b, 9c, 9d respectively, a chain cover 26, and an endless chain 21.

The air motor 20 rotates an output shaft (drive shaft) together with a rotor by, for example, a compressed air supplied from a predetermined air supply port. The motor gear 35 is fixed to the output shaft of the air motor 20. The motor bracket 23 fixes the air motor 20 to the aforesaid frame 24. Further, the relay gears 33 are rotatably supported on the frame 24 via support shafts. Further, the relay gears 34 are rotatably supported on the motor bracket 23 via support shafts.

Further, the endless chain 21 is hung around the motor gear 35, the relay gears 33, 34, and the sprockets 7a to 7d. Consequently, the endless chain 21 transmits a driving force of the air motor 20 to the female-threaded sleeves 9a to 9d via the aforesaid gears and sprockets 7a to 7d. Consequently, the sprockets 7a to 7d rotate in synchronization.

Further, the lift mechanism 31 forward-rotates or reverse-rotates the sprockets 7a to 7d in a circumference direction thereof (direction along outer peripheral surfaces of the sprockets 7a to 7d). That is, the lift mechanism 31 is capable of changing the lengths of the four holding parts 32 by changing the screwing depth of the male screws to the female screws. Consequently, the base 3 with the indexing devices 5a to 5c is moved up and down in the arrow Z1-Z2 direction.

Therefore, the indexing device installation unit 30 of the TIP system 1 according to this embodiment is capable of keeping the indexing devices 5a to 5c with the base 3 lifted up when the carriage of devices or the passage of a worker is necessary in the access tunnel 18. Further, the indexing device installation unit 30 is capable of moving down the indexing devices 5a to 5c with the base 3 at the time of the maintenance of the traversing in-core probe. Consequently, according to the indexing device installation unit 30, it is possible to improve maintainability of the traversing in-core probe without any hindrance to the passage and so on in the access tunnel.

Further, in the indexing device installation unit 30, the employment of the air motor 20 as the driving source of the lift mechanism 31 makes it possible to prevent the generation of electric noise when the base 3 is moved up and down (when the motor is driven). Therefore, according to the indexing device installation unit 30, it is possible to inhibit an adverse effect that electric noise has on performance of devices of the traversing in-core probe in which many monitors, sensors, and so on are installed.

Further, in the indexing device installation unit 30, while the four holding parts 32 hold the corner portions of the rectangular base 3 in a suspended state respectively, the driving force of the air motor 20 is transmitted via the endless chain 21 and so on to the female-threaded sleeves 9a to 9d to which the sprockets 7a to 7d are fitted. Therefore, the indexing device installation unit 30 is capable of rotating these sprockets 7a to 7d in synchronization, and as a result, is capable of synchronizing the up-down movements of the corner portions of the base 3. Consequently, the indexing device installation unit 30 is capable of moving the base 3 up and down in the arrow Z1-Z2 direction while preventing the inclination of the base 3 on which the indexing devices 5a to 5d are mounted.

Hitherto, the present invention is concretely described based on the embodiment, but the present invention is not limited only to this embodiment and the embodiment can be variously modified without departing from the spirit of the invention. For example, the lift mechanism 31 of the above-described embodiment uses the endless chain 21 for transmitting the driving force of the air motor 20, but instead, a belt or the like is also usable. Further, the lift mechanism 31 is composed of the combination of the female-threaded sleeves 9a to 9d and the male-threaded shafts 8a to 8d, but instead, ball screws (ball splines) or the like may be used to move the base 3 up and down.

Industrial Applicability

The present invention is also useful when devices disposed in a limited space are used both in an upper area and a lower area in the space.

Explanation of Numerals

1 . . . TIP system, 2 . . . nuclear reactor containment vessel, 3 . . . base, 5a, 5b, 5c . . . indexing device, 7a, 7b, 7c, 7d . . . sprocket, 8a, 8b, 8c, 8d . . . male-threaded shaft, 9a, 9b, 9c, 9d . . . female-threaded sleeve, 12 . . . local power range monitor detector, 18 . . . access tunnel, 19 . . . nuclear reactor pressure vessel, 20 . . . air motor, 21 . . . endless chain, 30 . . . indexing device installation unit, 31 . . . lift mechanism, 32 . . . holding part, 33, 34 . . . relay gear, 35 . . . motor gear.

What is claimed is:

1. An indexing device installation unit provided at an access tunnel, in a nuclear reactor containment vessel, the access tunnel leading a plurality of guide tubes to a local power range monitor detector provided in a nuclear reactor, the indexing device installation unit comprising:

an indexing device of a traversing in-core probe configured to selectively insert the guide tubes to a plurality of areas on the local power range monitor detector, the indexing device being provided in the access tunnel;

a base mounted with the indexing device;

a holding part configured to hold the base in a suspended state from a ceiling portion of the access tunnel; and a lift mechanism configured to uplift and down the base held by the holding part along with the indexing device in the access tunnel, the lift mechanism forming a predetermined clearance in the access tunnel when uplifting the base, so as to enable a worker to pass through the access tunnel, wherein the holding part has: a sleeve on whose inner surface a female thread is formed; a shaft screwed into the sleeve and having a male thread formed thereon; and a sprocket attached to one end of the sleeve, and one end of the shaft is fixed to the base; and wherein the lift mechanism has a driving source rotating the sprocket in a circumferential direction and, in moving the base up and down, changes a screwing depth of the shaft into the sleeve by rotating the sprocket.

2. The indexing device installation unit according to claim 1, wherein the base is formed in a rectangular shape;

wherein the holding part is provided in four sets so as to hold corner portions of the rectangular base in a suspended state respectively; and wherein the lift mechanism includes at least a chain that rotates the sprockets in synchronization by transmitting a driving force of the driving source to the sprockets of the four holding parts.

3. The indexing device installation unit according to claim 1, wherein the driving source of the lift mechanism is an air motor.

4. The indexing device installation unit according to claim 2, wherein the driving source of the lift mechanism is an air motor.

* * * * *